(12) United States Patent
Uno et al.

(10) Patent No.: US 6,586,049 B2
(45) Date of Patent: Jul. 1, 2003

(54) PATTERNING METHOD USING MASK AND MANUFACTURING METHOD FOR COMPOSITE TYPE THIN FILM MAGNETIC HEAD USING THE PATTERNING METHOD

(75) Inventors: Yasufumi Uno, Yamanashi (JP); Toru Inoue, Nagano (JP); Tetsuya Mino, Chiba (JP); Koji Matsukuma, Hyogo (JP)

(73) Assignee: TDK Corporation, Tokyo (JP)

( * ) Notice: Subject to any disclaimer, the term of this patent is extended or adjusted under 35 U.S.C. 154(b) by 227 days.

(21) Appl. No.: 09/732,894

(22) Filed: Dec. 11, 2000

(65) Prior Publication Data

US 2001/0019035 A1 Sep. 6, 2001

Related U.S. Application Data

(63) Continuation-in-part of application No. 09/141,425, filed on Aug. 27, 1998, now abandoned.

(30) Foreign Application Priority Data

Aug. 28, 1997 (JP) .............................................. 9-246002

(51) Int. Cl.$^7$ ................................ B05D 5/12; B44C 1/22
(52) U.S. Cl. ...................... 427/282; 427/130; 427/304; 216/22; 216/41; 216/63; 216/75
(58) Field of Search ................................ 427/304, 127, 427/129, 130, 131, 132, 282; 216/22, 41, 63, 75

(56) References Cited

U.S. PATENT DOCUMENTS

| | | | | | |
|---|---|---|---|---|---|
| 4,992,901 A | * | 2/1991 | Keel et al. | ................... | 360/110 |
| 5,141,623 A | * | 8/1992 | Cohen et al. | ............... | 205/122 |
| 5,695,656 A | * | 12/1997 | Park et al. | ..................... | 216/22 |

\* cited by examiner

Primary Examiner—Brian K. Talbot
(74) Attorney, Agent, or Firm—Arent Fox Kintner Plotkin & Kahn, PLLC

(57) ABSTRACT

A method of patterning at least one object layer, includes a step of forming a mask on the object layer, and a step of selectively etching the object layer using the mask. The mask is made of a magnetic metallic compound with a basic metal of nickel or cobalt containing at least group 3B element and/or group 5B element.

17 Claims, 2 Drawing Sheets

PATTERNING METHOD USING MASK AND MANUFACTURING METHOD FOR COMPOSITE TYPE THIN FILM MAGNETIC HEAD USING THE PATTERNING METHOD

CROSS-REFERENCES TO RELATED APPLICATIONS

This application is a continuation-in-part of application Ser. No. 09/141,425, filed on Aug. 27, 1998, now abandoned.

FIELD OF THE INVENTION

The present invention relates to a method of patterning, by using a mask, an object layer or object layers in a thin film element made of semiconductor material, conductive material, dielectric material or magnetic material. Particularly, the present invention relates to a patterning method for an object layer or layers in a thin film magnetic head and to a manufacturing method for a composite thin film magnetic head using the patterning method.

DESCRIPTION OF THE RELATED ART

In dry etching or milling process, an object layer or object layers to be etched is partially coated by a patterned mask made of a resist such as photo-curing resin, and exposed parts of the layer or layers are chemically and/or physically eroded and removed by plasma beam or ion beam.

In the field of such dry etching, in general, an extremely directional etching process whereby side edges of the etched pattern become perpendicular to the surface of its under layer is called as an anisotropic etching (also called as a directional etching or a vertical etching).

For example, when recording magnetic pole layers of a composite thin film magnetic head with both an inductive recording head part and a magnetoresistive (MR) reproducing head part are patterned by such dry etching, a fine working for forming side edges precisely perpendicular to the substrate surface is required. Thus, in this process, it is necessary to use the anisotropic etching.

In the dry etching or milling process, since the mask layer itself is also etched as well as the object layer or layers, the mask layer has to be sufficiently thick. However, if the thickness of the mask layer increases, it is difficult to execute the anisotropic etching.

During etching process, etched materials from not only the object layer or layers but also the mask layer may be scattered and thus a part of the scattered materials may be redeposited on side edges of the mask layer causing the width of the mask layer to gradually increase. As a result, the anisotropy of the etching, which is necessary for patterning the object layer or layers, will be almost lost causing the side edges of the etched object layer or layers to become non-perpendicular to the surface of its under layer. In other words, the section of the etched object layer or layers will become a trapezoid shape in which its lower part width is longer than its upper part width.

In order to decrease the thickness of the mask layer, U.S. Pat. No. 5,141,623 proposes the use of a mask layer made of nickel-iron alloy which has a milling rate equal to the milling rate of the object layer to be etched. However, the nickel-iron mask layer itself will be also etched and the etched component will be redeposited on the side edges of the mask layer. Furthermore the nickel-iron mask layer cannot be made sufficiently thin but will have a thickness of 2–2.5 µm. Thus, even if the nickel-iron mask layer is used, optimum anisotropy of the etching cannot be expected.

SUMMARY OF THE INVENTION

It is therefore an object of the present invention to provide a patterning method for at least one object layer and a manufacturing method for a composite thin film magnetic head using the patterning method, whereby side edges of the patterned layer becomes perpendicular to the surface of its under layer.

According to the present invention, a method of patterning at least one object layer, includes a step of forming a mask on the object layer, and a step of selectively etching the object layer using the mask. The mask is made of a magnetic metallic compound with a basic metal of nickel or cobalt containing at least group 3B element and/or group 5B element.

The magnetic metallic compound with a basic material of nickel metal or cobalt metal containing at least group 3B element and/or group 5B element has a milling rate extremely lower than that of the object layer or layers to milled. Thus, if such metallic compound is used for the material of the mask, the mask can be formed with very thin thickness. As a result, an excellent anisotropy can be surely expected.

Also, according to the present invention, a method of manufacturing a composite thin film magnetic head with an inductive recording head part and a magnetoresistive reproducing head part is provided. The method includes a step of forming recording magnetic pole layers of the thin film magnetic head, a step of forming a mask on the recording magnetic pole layers, and a step of selectively etching the recording magnetic pole layers using the mask. The mask is made of a magnetic metallic compound with a basic metal of nickel or cobalt containing at least group 3B element and/or group 5B element.

It is preferred that the group 3B element is boron, and/or that the group 5B element is phosphorus.

In this case, preferably, the mask has a composition containing 0.2 to 4.0 wt % of boron. Also, preferably, the mask has a composition containing 0.2 to 8.0 wt % of phosphorus.

If the weight composition of B contained in the NiB mask is 4.0 wt % or less, this NiB mask has magnetism. Also, if the weight composition of P contained in the NiP mask is 8.0 wt % or less, this NiP mask has magnetism. If the mask is made of such magnetic metallic compound, a very low milling rate that is extremely effective for the mask can be attained.

It is preferred that the object layer (or recording pole layers) includes an under layer for the mask, and that the under layer is made of an iron containing material such as nickel-iron, iron-nitrogen or iron-zirconium-nitrogen.

It is also preferred that the method further includes the steps of forming a resist frame with an opening portion in which the mask is to be formed on the object layer (or recording pole layers), forming the mask on the object layer (or recording pole layers) by an electroless plating process, and removing after the electroless plating process the resist frame.

It is also preferred that the method further includes the step of cleaning a surface to be plated by an acidic aqueous solution before the electroless plating process, and/or that a layer growing rate in the electroless plating process is kept at 100 nm/min or less.

Further objects and advantages of the present invention will be apparent from the following description of the preferred embodiments of the invention as illustrated in the accompanying drawings.

DESCRIPTION OF THE PREFERRED EMBODIMENTS

FIGS. 1a to 1g illustrate patterning processes in the preferred embodiment according to the present invention. In the embodiment, recording magnetic pole layers of a composite thin film magnetic head with an inductive recording head part and a MR reproducing head part are patterned by milling.

Figure 1A:
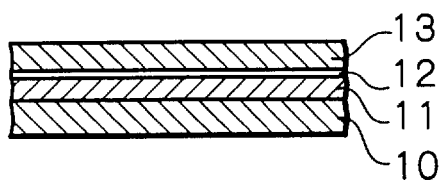
FIGS. 1a to 1g show sectional views illustrating patterning processes in a preferred embodiment according to the present invention.

The MR reproducing head part (not shown) is formed on a substrate or wafer (not shown). An upper shield layer 10 of the MR reproducing head part is shown in FIG. 1a. On the layer 10, a lower magnetic pole layer 11, a recording gap layer 12 and an upper magnetic pole layer 13 of the inductive recording head part are sequentially multi-layered.

The upper shield layer 10 is formed as a NiFe (nickel-iron) (80 wt % Ni-20 wt % Fe) layer with a thickness of about 3.5 μm by using photolithography and electroplating techniques. Each of the lower pole layer 11 and the upper pole layer 13 is formed as a high Bs material layer such as FeZrN (iron-zirconium-nitrogen) or FeN (iron-nitrogen) with a thickness of about 0.5 μm by using spattering technique. In stead of the high Bs material, the pole layers 11 and 13 may be made of NiFe. The recording gap layer 12 is formed as an insulation material layer with a thickness of about 0.3 &L m by using spattering technique.

Figure 1B:
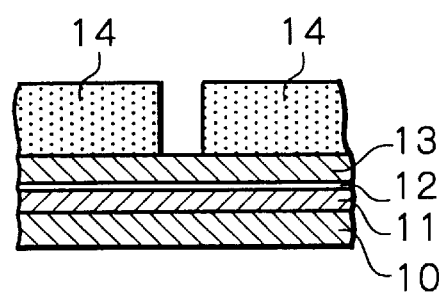

Then, as shown in FIG. 1b, a resist frame 14 having an opening portion for plating a mask with a width of for example about 0.3–2.0 μm is formed on the upper pole layer 13. In this embodiment, the resist frame 14 is formed as a novolac resist layer with a thickness of about 2.0–5.0 μm by using photolithography technique.

Figure 1C:
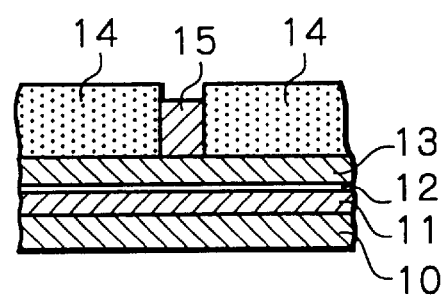

Then, as shown in FIG. 1c, the mask 15 is formed by using electroless metal plating technique. Before electroless metal plating, it is desired to dip the wafer into 4.5% HCl aqueous solution for about 1.5 minute to give wettability to the plating surface.

The mask 15 is made of a metallic compound with a basic metal of nickel (Ni) or cobalt (Co) containing group 3B element such as boron (B) and/or group 5B element such as phosphorus (P), and has a thickness of about 1.0–3.0 μm.

Figure 2:
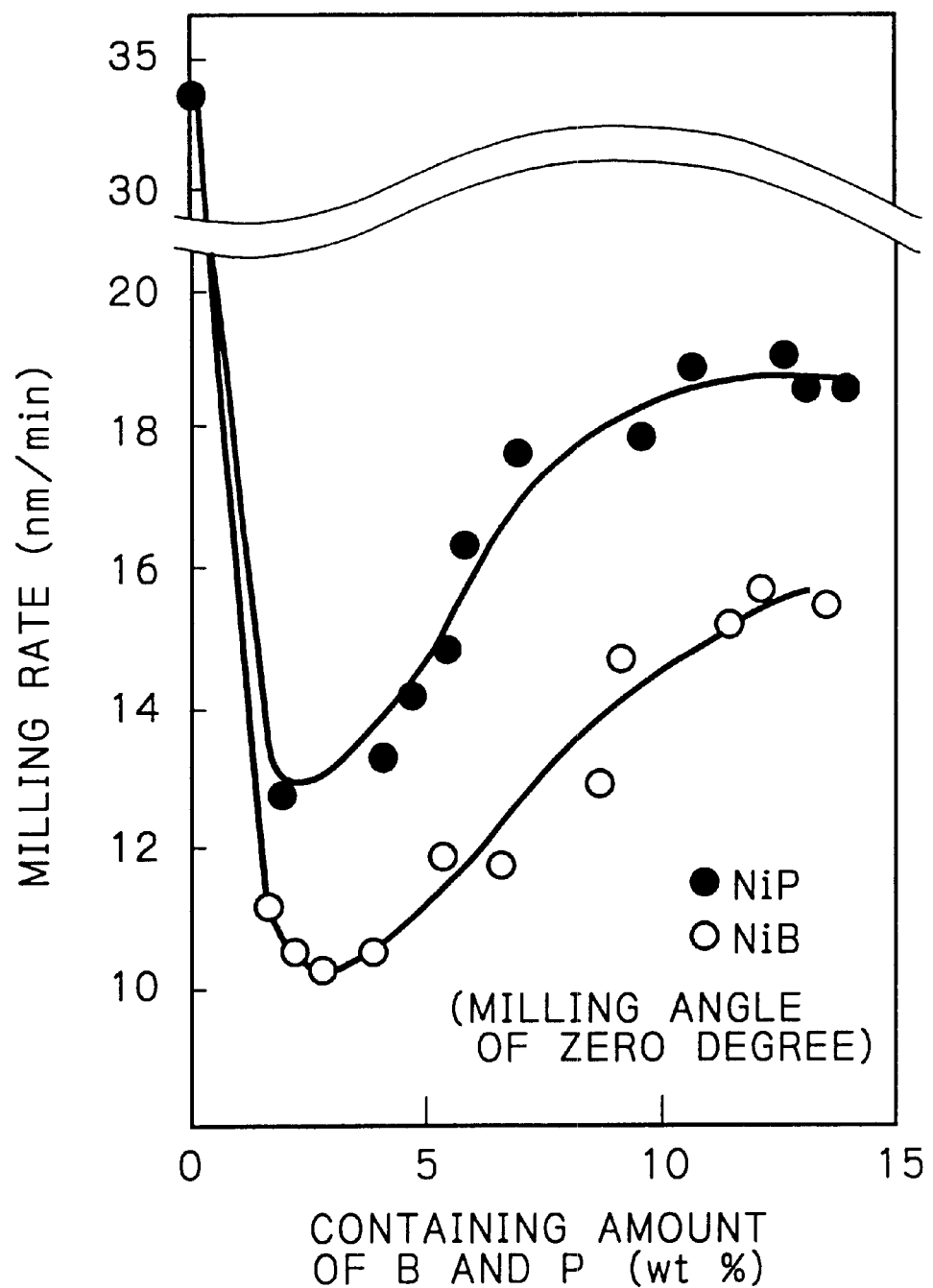
FIG. 2 shows a graph illustrating characteristics of milling rate of a mask with respect to containing amount of B and P.

FIG. 2 shows changes in milling rates of a NiB mask with a basic metal of Ni containing B and a NiP mask with a basic metal of Ni containing P in response to change in the containing amount of B and P, respectively. As will be apparent from this figure, the NiB mask containing 2.5 wt % of B has the lowest milling rate of about 10 nm/min.

The milling rate of the high Bs material layers and the NiFe layer which constitute the object layers to be patterned, namely the pole layers 11 and 13 and the recording gap layer 12, is about 20 nm/min. It is considered that a milling rate of about ¾ of the above-mentioned milling rate for the object layers or less may satisfy requirements for that of the mask 15. Therefore, it will be understood from FIG. 2 that adequate containing amount of B or P is within a range of 0.2–14.0 wt %.

Particularly, according to the instant invention, it is important that the NiB mask contains B of 4.0 wt % or less and that the NiP mask contains P of 8.0 wt % or less. If the weight composition of B contained in the NIB mask is 4.0 wt % or less, this NIB mask has magnetism. Also, if the weight composition of P contained in the NIP mask is 8.0 wt % or less, this NIP mask has magnetism. If the mask 15 is made of such magnetic metallic compound, a very low milling rate that is extremely effective for the mask can be attained.

Following Table 1 indicates desired compositions of the mask 15 with magnetism.

TABLE 1

| BASE MATERIAL | CONTAINED FIRST ELEMENT | WEIGHT COMPOSITION OF FIRST ELEMENT | CONTAINED SECOND ELEMENT | WEIGHT COMPOSITION OF SECOND ELEMENT |
|---|---|---|---|---|
| Ni | B | 0.2–4.0 wt % | — | — |
| Ni | P | 0.2–8.0 wt % | — | — |
| Ni | B | 0.2–4.0 wt % | W | 10–20 wt % |
| Ni | P | 0.2–5.0 wt % | W | 10–20 wt % |
| Co | B | 0.2–4.0 wt % | — | — |
| Co | P | 0.2–8.0 wt % | — | — |
| Co | B | 0.2–5.0 wt % | W | 10–30 wt % |
| Co | P | 0.2–8.0 wt % | W | 10–30 wt % |
| Ni | B | 0.2–4.0 wt % | Co | 5–25 wt % |
| Ni | P | 0.2–8.0 wt % | Co | 5–25 wt % |

The electroless plating generally requires simpler equipment than that of the electroplating. However, since a layer growing rate in the electroless plating process is high as typically at 20–30 μm/hour, the plating solution will not be sufficiently provided into the mask pattern even if it is formed in 1 μm width order. Therefore, it has been very difficult to realize micromachining by the electroless plating. However, the layer growing rate in the electroless plating can be decreased by properly adjusting temperature and hydrogen ion concentration (pH) in the plating bath resulting that the electroless plating can be used for forming a micropattern. In addition, insufficient provision of the plating solution into the mask pattern can be greatly improved by using iron containing material for the under layer of plating (upper pole layer 13 in this embodiment) and by preprocessing using an acidic aqueous solution the surface to be plated.

According to this embodiment, the electroless plating is executed after dipping the wafer into a plating solution diluted by pure water to have a hydrogen ion concentration of pH 6.1 and kept at a temperature of 60° C. (NiB electroless plating solution for example) for 15 minutes. In consideration of heat applied to the resist material, the temperature of the electroless plating solution will be kept between 50–90° C., preferably at 60° C. The hydrogen ion concentration of the electroless plating solution is desired to keep at pH 7 or less, more preferably between pH 5–6.8. Under these conditions, according to this embodiment, the layer growing rate is about 100 nm/min (6 μm/hour) or less which is greatly lower than that of the conventional art (20–30 μm/hour) resulting that insufficient provision of the plating solution into the mask pattern can be greatly improved. Thus, micropattern can be formed by the electroless plating.

Figure 1D:
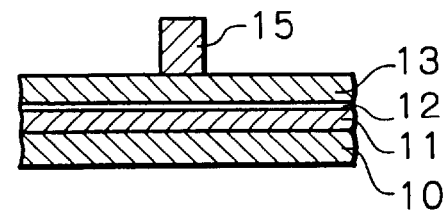

Then, the resist frame 14 is flaked and removed by using a remover such as acetone to obtain the patterned mask 15 shown in FIG. 1d.

Figure 1E:
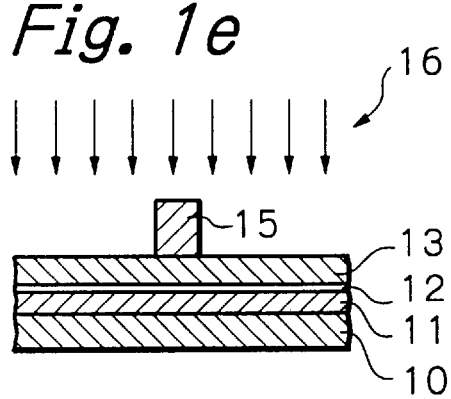
Figure 1F:
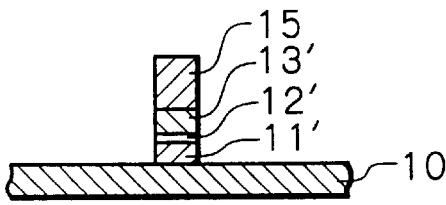

Thereafter, as shown in FIG. 1e, the object layers 11, 12 and 13 are etched or ion milled by using the mask 15. In the ion milling, acceleration voltage is kept at 500 mV and acceleration current is kept at 400 mA for example. By this milling process, the lower pole layer 11, the recording gap layer 12 and the upper pole layer 13 except for an area of the recording pole layers 11', 12' and 13' located under the patterned mask 15 are removed as shown in FIG. 1f.

Figure 1G:
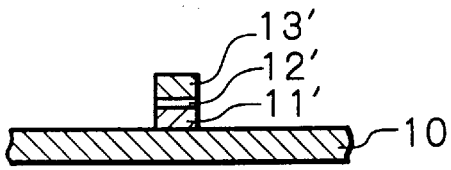

Then, the mask 15 is flaked and removed to form the recording pole layers 11', 12' and 13' as shown in FIG. 1g.

According to the above-mentioned embodiment, the mask 15 is made of the magnetic metal compound with a basic metal of Ni or Co containing a group 3B element such as B and/or a group 5B element such as P. Since this metal compound has a milling rate greatly lower than that of materials of the object layers, namely the lower pole layer 11, the recording gap layer 12 and the upper pole layer 13, the mask 15 can be formed with a very thin thickness. Therefore, an excellent anisotropy of the milling (perpendicularity with 90°±2° to the under layer surface) can be surely expected. In addition, the micropattern can be formed by the electroless plating process. Furthermore, since the mask 15 is made of a magnetic material, this mask can be remained without removing and used as a part of the upper pole layer.

The milling rate of the mask 15 can be more lowered by annealing this mask after the electroless plating process at about 250° C. During manufacturing the composite magnetic head with the lower and upper pole layers 11 and 13 made of FeZrN, a heat treatment at a temperature of about 250° C. for several hours under vacuum environment will be in general executed so as to increase the hardness of the composition. In this case, if this heat treatment is executed after formation of the mask 15, the aforementioned annealing of the mask 15 can be attained without increasing the number of processes.

In the above-mentioned embodiment, a recording magnetic pole layer of a composite thin film magnetic head with both an inductive recording head part and a MR reproducing head part is patterned. The patterning method according to the present invention, however, can be used not only for forming of micropatterns on metallic magnetic thin films but also for patterning on other thin films such as organic compound thin films and on nonorganic compound thin films.

Due to usage of iron containing material for the under layer of the mask and for cleaning the surface to be plated using an acidic aqueous solution, the electroless plating can be adopted to micromachining such as formation of the mask according to the present invention.

Hereinafter, an example of actual mask forming processes is described in detail.

On an AlTiC substrate, an insulation layer of $Al_2O_3$ with a thickness of 5000 nm is deposited. On the $Al_2O_3$ layer, a NiFe layer with a thickness of 500 nm is deposited. This NiFe layer eases the preprocess with acid.

On the surface of the NiFe layer, a resist frame having a part which exposes the NiFe layer and has a width of 1500 nm is formed by a photoprocess using a novolac resist material.

Then, the substrate is dipped into 4.5% HCl aqueous solution for about 1.5 minute to give wettability to the plating surface of the substrate.

Then, the substrate is dipped into NiB electroless plating solution with pH 6.1 and kept at 60° C. for 15 minutes to execute the electroless plating. Thereafter, the resist frame is removed by using a remover.

As a result, an excellent anisotropy NiB mask with a thickness of 1500 nm is formed. A layer growing rate of this mask is about 100 nm/min. This mask has a composition containing 2.5 wt % of B.

A milling rate of the NiB mask just after plating is 8.28 nm/min, and after annealing at 250° C. is 7.94 nm/min. These milling rates are equal to or less than one half of that of the NiFe layer (20 nm/min) which is one of the patterned layer and are close to that of $Al_2O_3$ (6.51 nm/min). Therefore, this mask is extremely effective for the patterning mask of the recording pole layer in the composite thin film magnetic head. According to the present invention, such excellent mask can be quite easily formed.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of patterning at least one object layer, comprising the steps of:

forming a mask on said object layer; and selectively etching said object layer using said mask, said mask being made of a magnetic metallic compound with a basic metal of nickel or cobalt and containing at least 0.2 to 4.0 wt. % of boron or 0.2 to 8 wt. % of phosphorous.

2. The method as claimed in claim 1, wherein said object layer includes an under layer for said mask, and wherein said under layer is made of an iron containing material.

3. The method as claimed in claim 2, wherein said iron containing material is nickel-iron.

4. The method as claimed in claim 2, wherein said iron containing material is iron-nitrogen.

5. The method as claimed in claim 2, wherein said iron containing material is iron-zirconium-nitrogen.

6. The method as claimed in claim 2, wherein said method further includes the steps of forming a resist frame with an opening portion in which said mask is to be formed on said object layer, forming said mask on said object layer by an electroless plating process, and removing after said electroless plating process said resist frame.

7. The method as claimed in claim 6, wherein said method further includes the step of cleaning a surface to be plated by an acidic aqueous solution before said electroless plating process.

8. The method as claimed in claim 6, wherein a layer growing rate in said electroless plating process is kept at 100 nm/min or less.

9. The method as claimed in claim 1, wherein said at least one object layer is recording magnetic pole layers of a composite thin film magnetic head with an inductive recording head part and a magnetoresistive reproducing head part, and wherein said etching step is a step of selectively dry etching said recording magnetic pole layers using said mask.

10. A method of manufacturing a composite thin film magnetic head with an inductive recording head part and a magnetoresistive reproducing head part, said method comprising the steps of:

forming recording magnetic pole layers of said thin film magnetic head;

forming a mask on said recording magnetic pole layers; and selectively etching said recording magnetic pole layers using said mask, said mask being made of a magnetic metallic compound with a basic metal of nickel or cobalt and containing at least 0.2 to 4.0 wt. % of boron or 0.2 to 8 wt. % of phosphorous.

11. The method as claimed in claim 10, wherein said recording magnetic pole layers include an under layer for said mask, and wherein said under layer is made of an iron containing material.

12. The method as claimed in claim 11, wherein said iron containing material is nickel-iron.

13. The method as claimed in claim 11, wherein said iron containing material is iron-nitrogen.

14. The method as claimed in claim 11, wherein said iron containing material is iron-zirconium-nitrogen.

15. The method as claimed in claim 10, wherein said method further includes the steps of forming a resist frame with an opening portion in which said mask is to be formed on said recording magnetic pole layers, forming said mask on said recording magnetic pole layers by an electroless plating process, and removing after said electroless plating process said resist frame.

16. The method as claimed in claim 15, wherein said method further includes the step of cleaning a surface to be plated by an acidic aqueous solution before said electroless plating process.

17. The method as claimed in claim 15, wherein a layer growing rate in said electroless plating process is kept at 100 nm/min or less.

* * * * *